United States Patent Office 3,105,802
Patented Oct. 1, 1963

3,105,802
SYNTHESIS OF FATTY ACIDS
Charles E. Stoops, Bartlesville, Okla., assignor to Phillips Petroleum Company, a corporation of Delaware
No Drawing. Filed Dec. 29, 1958, Ser. No. 783,207
6 Claims. (Cl. 204—162)

This invention relates to the production of aliphatic carboxylic acids. In a more specific aspect the invention relates to a process for reacting ethylene with acetic acid to produce a mixture of saturated aliphatic organic carboxylic acids having a greater number of carbon atoms than the initial carboxylic acid.

It is an object of the invention to produce higher molecular weight organic carboxylic acids by reaction of ethylene with acetic acid without the necessity to resort to extremely high pressures for effecting the reaction. Other objects, as well as aspects and advantages, of the invention will become apparent from a consideration of the accompanying disclosure.

In prior art methods for the preparation of these acids it has been necessary to employ high temperatures and/or high pressures with catalysts. The catalysts can add appreciably to the cost and contaminate the product. I have discovered that these and other disadvantages can be eliminated by mixing the reactants in the presence of ionizing rays so as to produce the desired acid.

According to the invention there is provided a process which comprises reacting ethylene with acetic acid while exposing the reactants to ionizing radiation equivalent to at least 200 electron-volts, per photon in the case of electromagnetic radiations, and per particle in the case of high energy ionizing particle radiation, and thereby producing organic aliphatic carboxylic acids containing a greater number of carbon atoms than the reactant carboxylic acid.

The high energy ionizing radiations employed according to the invention include electromagnetic radiations having a wave length of less than about 62 Angstrom units and high energy particle radiations equivalent to an energy of at least 200 electron-volts per particle.

Ionizing rays which are effective include alpha rays, beta rays, gamma rays and X-rays. Any suitable source of radiation can be employed in the process. Sources of radiation include electrical devices such as cathode tubes which produce electrons and various accelerators (e.g. cyclotron, synchrotron, betatron) which produce electrons, protons, deuterons, and alpha particles. The natural and artificial radioactive elements are important sources of radiation. For instance, radium, thorium, bismuth, palladium, cobalt, phosphorus, strontium, and the like can be used as a source of rays. Spent fuel elements represent an important source of ionizing radiations; and because they are a low cost source of ionizing radiation, spent fuel elements are now most frequently used. Still another source of ionizing radiations are the highly energetic fragments which result at the moment of fission.

Although side reaction occurs in the process of the present invention, it appears that the main overall reaction may be represented by the equation $$nC_2H_4 + H-R-COOH \rightarrow H-(C_2H_4)_n-R-COOH$$

where $n$ is an integer having a value of at least 4.

The long-chain carboxylic acids, their salts and other derivatives have found many applications. They are used in rubber compounding. Recently, the acids have been employed to effect formation of a monomolecular film on the surface of water (lakes, etc.) so as to decrease the evaporation rate of the water.

It is a feature of the present process that the reaction can be effected conveniently at ambient temperatures, or over a broad temperature range, as desired. The usual temperature range employed is from 0 to 50° C. Temperatures below 0 and on up to high temperatures such as 300° C. or even higher can be employed. Of course, it is not desirable that temperatures which will result in thermal cracking of the reactant acid be employed in the usual case. Usually the reaction is effected at a temperature at which the reactant acid is above its melting point.

Another feature of the invention is that a wide range of pressures can be employed, including pressures as low as 0.001 atmosphere and lower on up through pressures ranging to about 200 atmospheres or even higher, if desired. Low pressures in the range from 0.001 to 0.2 atmosphere are particularly desirable when effecting continuous vapor phase reactions. The pressures can also be chosen so that the acid is mostly in the liquid phase while the ethylene is largely in the vapor phase. Higher pressures, resulting in maintaining both the acid and the ethylene substantially all in the liquid or dense phase are also applicable. However, a particular advantage of the invention is that the reactions can be effected in any case employing pressures below 300 p.s.i.a.

The mixture of ethylene and the carboxylic acid reactant is irradiated with the high energy ionizing rays at a dose rate of $10^3$ to $10^{10}$ roentgens equivalent physical per hour (rep. units). The total dosage is usually in the range from $10^5$ to $10^{11}$, more often in the range from $10^6$ to $10^{10}$ rep. units.

The product or reaction mixture resulting from the process of the invention contains some starting materials, usually, and a mixture of organic carboxylic acids. This mixture can be worked up in any desired manner to separate unreacted ethylene and any unreacted starting material acid. Of course, the ethylene is easily removed by venting from the reaction mixture and can be recycled to the process. Lower molecular weight acids in the reaction mixture can, for example, be extracted with a solvent such as water and ethylether, and the residual undissolved acids can be recovered and, if desired, further separated by fractional distillation.

The reaction of ethylene and acetic acid can be effected in a batch or continuous process. The mol ratio of ethylene to acid is commonly in the range of 10 to 0.1, although higher and lower ratios are operable.

Example I

Glacial acetic acid (434.1 grams) was charged to a bomb which was equipped with an agitator (dasher type). The bomb was connected to a cylinder containing ethylene. The bomb was placed in a field of gamma rays from spent fuel elements from the Materials Testing Reactor at Arco, Idaho. By means of a pressure regulator the ethylene pressure to the bomb was maintained at 250 p.s.i.g. The acetic acid-ethylene mixture was agitated during irradiation at an internal rate of $3.44 \times 10^5$ rep./hr. to a total dose of $10^7$ rep. The reaction temperature was 175° F. (79° C.).

The product recovered from the bomb amounted to 427.4 grams. This product was distilled at atmospheric pressure to yield 384.2 grams of material which distilled at atmospheric pressure and at temperatures between 109 and 119° C., and 36.0 grams of a pot residue. A portion of this residue (34.95 gms.) was transferred to a smaller still and again fractionated at atmospheric pressure to yield two fractions. One portion (13.48 g.) boiling between 118–119° C. had an acid equivalent weight of 66; the second portion (12.79 g.) boiling between 119–120° C. had an acid equivalent weight of 67–69. A portion of the residue, about 5.90 grams, was then distilled at reduced pressure. The first portion, 0.94 gram, distilling at a temperature of 88–100° C. at 7.8–10.5 millimeters mercury pressure had an acid equivalent weight of 192. A second portion of 0.82 gram distilled at 120–148° C. at 11.0–13.3 mm. mercury pressure, and its acid equivalent weight was 245. Another fraction recovered in a Dry Ice trap of about 0.3 gm. had an acid equivalent of 212. There was recovered 2.33 grams of residue from the still which had an acid equivalent weight of 1115.

These data show that the reaction product can be separated by distillation into fractions having equivalent weights bordering that of acetic acid (equivalent weight of 60) to a value of 1115.

The equivalent weights of these portions described above were obtained by titration of weighed samples (about 0.2 to 0.5 gram) dissolved in 100 ml. of methyl alcohol using 0.100 N sodium hydroxide. In each case, the titration curve obtained by plotting pH versus alkali added was a sigmoid curve characteristic of monobasic acids.

*Example II*

Ethylene (22 grams) was charged to a bomb containing 156 grams of glacial acetic acid. The bomb was placed in a field of gamma rays from spent fuel elements from the Materials Testing Reactor at Arco, Idaho, at a canal temperature between 20 and 30° C. The material was irradiated at an internal rate of $2 \times 10^6$ rep./hr. to an internal dose of $1 \times 10^8$ rep. The bomb was then vented and 161.7 grams of material was recovered from the bomb. The product was a soft white gel containing unreacted acetic acid.

One portion of the gel was mixed with water and heated to the boiling point. The water was then discarded and the process repeated until the washings were no longer acidic to litmus paper. The resulting material was dried in vacuum. The product was a white residue which by infrared analysis was identified as principally crystalline carboxylic acid.

The molecular weight of water-washed material was determined by elevation of the boiling point in benzene solution and found to be 599. The equivalent weight as determined by titration with acid was found in duplicate runs to be 685 and 694. It was also found from this test that the water-insoluble material which remained amounted to about 25 percent by weight of the gel.

Another portion (43.8679 g.) of the sample was distilled to yield a cut (0.4173 g.) boiling from 163–172° C. at a pressure between 21.6 and 35 mm. of mercury. The infrared spectra showed the material to be principally carboxylic acids with indication of some acetates. The pot residue after removing this cut was also found to be principally carboxylic acids.

*Example III*

Two hundred fifty ml. of reagent grade glacial acetic acid was added to a reactor comprising a 33 mm. O.D., 30 mm. I.D. quartz tube concentrically mounted in a 3 inch, schedule 40 stainless steel pipe provided with a stainless steel cooling coil, and having a volume of about 500 cc. in the annular reaction space. The reactor was thoroughly purged by passing ethylene vapors through it for about 10 minutes. The reactor was then pressured with about 225 p.s.i.g. of C.P. grade ethylene. The annular reactor space was then exposed through the central quartz tube to ultraviolet light from a 450 watt U.V. lamp, while agitating the reactor in a shaker and controlling the temperature at 98 to 100° F. The total ultraviolet radiation to which the acetic acid-ethylene mixture was exposed was about $2 \times 10^8$ rep. units over a period of about two hours. At the end of this period the ethylene pressure had decreased only about 15 p.s.i., indicating little reaction.

An 84.7 g. portion of the product was distilled in a 20 mm. x 12 inch column packed with "Helipack" packing at a 10 to 1 reflux ratio. Initial boiling point was 114° C. and highest boiling point 117° C. The pot residue amounted to 7.33 g. Acetic acid was the only overhead. The kettle residue had a green color which indicated some chemical attack of the stainless steel reactor.

After standing overnight, a small amount of precipitate could be seen. This was filtered from a 166.7 gram sample and amounted to .0243 gram. This corrects to .035 gram of filterable solid for the entire run. A 57.88 gram sample of the filtered sample was concentrated to 4.72 grams and subjected to vapor phase chromatography. No butyric acid was detected. The limits of detectability are .05 weight percent. Nor was there any evidence of caproic acid. When 10 ml. of the filtered sample was added to 50 cc. of distilled water a white layer developed. When this was filtered through a medium fritted glass crucible, and the crucible dried to constant weight at approximately 55° C., the crucible gained .0079 gram in weight. This corresponds to .1875 gram for the total sample.

The identity of the product was not characterized. In any case the total yield is insignificant compared to that obtained with gamma rays.

The foregoing example illustrates the ineffectiveness of even large dosages of ultraviolet light for the present reaction.

As will be evident to those skilled in the art, various modifications of this invention can be made or followed in the light of the foregoing disclosure and discussion without departing from the spirit and scope of the disclosure or from the scope of the claims.

I claim:

1. A process which comprises exposing a mixture of ethylene and acetic acid to the action of $10^5$ to $10^{11}$ rep. units of high energy ionizing radiation having an energy equivalent to at least 200 electron-volts (per photon when the radiation is electromagnetic radiation, and per particle when the radiation is high energy particle radiation), and thereby producing a mixture comprising aliphatic organic acids each of which has a greater number of carbon atoms than the said acetic acid.

2. A process which comprises exposing a mixture of ethylene and acetic acid to the action of $10^6$ to $10^{10}$ rep. units of high energy ionizing radiation having an energy equivalent to at least 200 electron-volts (per photon when the radiation is electromagnetic radiation, and per particle when the radiation is high energy particle radiation), and thereby producing a mixture comprising aliphatic organic acids each of which has a greater number of carbon atoms than the said acetic acid.

3. A process which comprises exposing a mixture of ethylene and acetic acid to the action of $10^5$ to $10^{11}$ rep. units of gamma radiation, and thereby producing a mixture comprising aliphatic organic acids each of which has a greater number of carbon atoms than the said acetic acid.

4. A process which comprises exposing a mixture of ethylene and acetic acid maintained at a pressure below 300 p.s.i.a. to the action of $10^5$ to $10^{11}$ rep. units of high energy ionizing radiation having an energy equivalent to at least 200 electron-volts (per photon when the radiation is electromagnetic radiation, and per particle when the radiation is high energy particle radiation), and thereby producing a mixture comprising aliphatic organic acids each of which has a greater number of carbon atoms than the said acetic acid.

5. A process which comprises exposing a mixture of ethylene and acetic acid to the action of $10^6$ to $10^{10}$ rep. units of high energy ionizing radiation having an energy equivalent to at least 200 electron-volts (per photon when the radiation is electromagnetic radiation, and per particle when the radiation is high energy particle radiation) at a dosage rate of $10^3$ to $10^{10}$ rep. units per hour, and thereby producing a mixture comprising aliphatic organic acids each of which has a greater number of carbon atoms than the starting material acid.

6. A process which comprises exposing a mixture of ethylene and acetic acid to the action of $10^5$ to $10^{11}$ rep. units of gamma radiation at a dosage rate of $10^3$ to $10^{10}$ rep. units per hour, and thereby producing a mixture comprising aliphatic organic acids each of which has a greater number of carbon atoms than the starting material acid.

References Cited in the file of this patent

UNITED STATES PATENTS

| 2,743,223 | McClinton et al. | Apr. 24, 1956 |
| 2,823,216 | Moote et al. | Feb. 11, 1958 |
| 2,940,914 | Hoover | June 14, 1960 |

OTHER REFERENCES

Bourne et al.: "Chem. and Ind.," pages 1372–1376, November 24, 1956.